(12) United States Patent
Samaniego et al.

(10) Patent No.: US 9,910,134 B2
(45) Date of Patent: Mar. 6, 2018

(54) ENHANCED DETECTION AND AUTOMATIC SIGNATURE EXTRACTION OF RADAR RESONANCE REFLECTIONS IN ABOVE AND BELOW-GROUND MAN-MADE OBJECTS

(71) Applicant: RAYTHEON COMPANY, Waltham, MA (US)

(72) Inventors: Raymond Samaniego, Prosper, TX (US); Enrique A. Santiago, Tucson, AZ (US); John L. Tomich, Coppell, TX (US)

(73) Assignee: RAYTHEON COMPANY, Waltham, MA (US)

( * ) Notice: Subject to any disclaimer, the term of this patent is extended or adjusted under 35 U.S.C. 154(b) by 394 days.

(21) Appl. No.: 14/608,977

(22) Filed: Jan. 29, 2015

(65) Prior Publication Data
US 2016/0223646 A1    Aug. 4, 2016

(51) Int. Cl.
*G01S 13/88* (2006.01)
*G01S 7/04* (2006.01)
(Continued)

(52) U.S. Cl.
CPC .............. *G01S 7/04* (2013.01); *G01S 13/885* (2013.01); *G01S 13/90* (2013.01); *H01Q 1/3258* (2013.01); *H01Q 21/064* (2013.01)

(58) Field of Classification Search
CPC .......... G01S 7/04; G01S 13/885; G01S 13/90; G01S 13/953; G01S 13/951; G01S 7/292; G01S 13/9023; G01S 13/5244; G01S 7/025; G01S 7/24; G01S 13/5246; G01S 7/412; G01S 7/024; G01S 13/887;
(Continued)

(56) References Cited

U.S. PATENT DOCUMENTS 4,490,719 A * 12/1984 Botwin ................. F41G 7/2226
                                                342/188
5,311,183 A *  5/1994 Mathews ............... G01S 13/953
                                                342/26 B
(Continued)

OTHER PUBLICATIONS

U.S. Appl. No. 13/086,107, filed Apr. 13, 2011, entitled "Subterrainean Image Generating Device and Associated Method", 36 pages.
(Continued)

*Primary Examiner* — Timothy A Brainard
*Assistant Examiner* — Nuzhat Pervin
(74) *Attorney, Agent, or Firm* — Lewis Roca Rothgerber Christie LLP

(57) ABSTRACT

A system and method for processing radar returns to identify returns from man-made objects. In one embodiment, a plurality of radar returns is used to form a corresponding plurality of resonance maps, which are combined using an ordered statistic to form a processed resonance map. A discriminant is calculated as (a) the fourth power of the ratio of (i) the power in a first rectangle about each pixel to (ii) the power in a region outside the first rectangle and inside a second, larger rectangle, or (b) zero if the ratio is less than 1. Other processing operations including thresholding operations to suppress noise and clutter are used to improve the signal to noise ratio for detecting man-made objects.

15 Claims, 4 Drawing Sheets

(51) Int. Cl.
*G01S 13/90* (2006.01)
*H01Q 1/32* (2006.01)
*H01Q 21/06* (2006.01)

(58) Field of Classification Search
CPC ...... G01S 13/5248; G01S 7/282; G01S 13/04; G01S 13/524; G01S 7/2813; G01S 7/415; H01Q 1/3258; H01Q 21/064; F41G 7/2226; G01R 23/16; G06K 9/46; B82Y 5/00
USPC ........................................................ 342/179
See application file for complete search history.

(56) References Cited

U.S. PATENT DOCUMENTS

| | | | | |
|---|---|---|---|---|
| 5,469,168 | A * | 11/1995 | Anderson | G01S 13/0218 342/192 |
| 5,499,030 | A * | 3/1996 | Wicks | G01S 7/292 342/159 |
| 5,539,412 | A * | 7/1996 | Mendelson | G01R 23/16 324/76.19 |
| 5,612,928 | A * | 3/1997 | Haley | G06K 9/46 367/11 |
| 5,742,250 | A * | 4/1998 | Krikorian | G01S 13/9023 342/25 C |
| 5,841,395 | A * | 11/1998 | Simone | G01S 13/5244 342/196 |
| 6,243,036 | B1 * | 6/2001 | Chadwick | G01S 7/025 342/175 |
| 6,967,612 | B1 * | 11/2005 | Gorman | G01S 7/024 342/175 |
| 7,193,558 | B1 * | 3/2007 | Gerlach | G01S 7/295 342/195 |
| 7,352,321 | B2 * | 4/2008 | Szajnowski | G01S 7/412 342/192 |
| 7,492,303 | B1 * | 2/2009 | Levitan | G01S 7/024 342/188 |
| 7,916,068 | B2 * | 3/2011 | Wicks | G01S 13/5248 342/109 |
| 7,990,308 | B2 * | 8/2011 | Birdsong, Jr. | G01S 7/282 342/196 |
| 8,237,605 | B2 * | 8/2012 | Abatzoglou | G01S 13/524 342/104 |
| 8,618,976 | B2 * | 12/2013 | Paglieroni | G01S 13/90 342/191 |
| 8,711,028 | B2 * | 4/2014 | Paglieroni | G01S 13/90 342/22 |
| 8,717,230 | B1 * | 5/2014 | Fischi | G01S 7/2813 342/159 |
| 8,730,085 | B2 | 5/2014 | Paglieroni et al. | |
| 8,816,899 | B2 * | 8/2014 | Abatzoglou | G01S 7/415 342/159 |
| 8,836,573 | B2 * | 9/2014 | Yanagihara | G01S 7/412 342/179 |
| 8,854,248 | B2 | 10/2014 | Paglieroni et al. | |
| 8,854,249 | B2 | 10/2014 | Paglieroni et al. | |
| 2004/0111219 | A1 * | 6/2004 | Gulati | B82Y 5/00 702/19 |
| 2009/0058710 | A1 * | 3/2009 | Levitan | G01S 7/024 342/22 |
| 2010/0214154 | A1 * | 8/2010 | Birdsong, Jr. | G01S 13/887 342/90 |
| 2012/0062409 | A1 * | 3/2012 | Pun | G01S 7/292 342/27 |
| 2012/0319893 | A1 * | 12/2012 | Yun | G01S 13/9023 342/25 C |
| 2017/0045613 | A1 * | 2/2017 | Wang | G01S 13/9303 |

OTHER PUBLICATIONS

U.S. Appl. No. 14/051,037, filed Oct. 10, 2013, entitled "Radar Detection of a Concealed Object on a Person's Body", 23 pages.

* cited by examiner

ENHANCED DETECTION AND AUTOMATIC SIGNATURE EXTRACTION OF RADAR RESONANCE REFLECTIONS IN ABOVE AND BELOW-GROUND MAN-MADE OBJECTS

CROSS-REFERENCE TO RELATED APPLICATION(S)

This application is related to and incorporates by reference in its entirety, as if set forth in full, U.S. patent application Ser. No. 13/086,107, filed Apr. 13, 2011, entitled "SUBTERRANEAN IMAGE GENERATING DEVICE AND ASSOCIATED METHOD", and U.S. patent application Ser. No. 14/051,037, filed Oct. 10, 2013, entitled "RADAR DETECTION OF A CONCEALED OBJECT ON A PERSON'S BODY".

BACKGROUND

1. Field

One or more aspects of embodiments according to the present invention relate to detection of objects using radar, and more particularly to a system and method for detecting man-made objects above ground or below ground.

2. Description of Related Art

Improvised explosive devices (IEDs) are a threat to troops and may be buried underground or located just above ground, e.g., hidden in shrubbery. These man-made devices may contain metal parts or have other characteristics that cause them to reflect radar signals in a recognizable manner. Identifying such devices may be useful for counteracting any threats they may pose. However, the radar returns from such objects may be cluttered and susceptible to receiver noise, especially when using techniques to sharpen images formed from the returns. Separating signatures of true objects from false alarms caused by noise and clutter may be a difficult problem. Thus, there is a need for a system and method for detecting man-made objects above ground or below ground that is robust in the presence of receiver noise.

SUMMARY

Aspects of embodiments of the present disclosure are directed toward a system and method for processing radar returns to identify returns from man-made objects. In one embodiment, a plurality of radar returns is used to form a corresponding plurality of resonance maps, which are combined using an ordered statistic to form a processed resonance map. A discriminant is calculated as (a) the fourth power of the ratio of (i) the power in a first rectangle about each pixel to (ii) the power in a region outside the first rectangle and inside a second, larger rectangle, or (b) zero if the ratio is less than 1. Other processing operations including thresholding operations to suppress noise and clutter are used to improve the signal to noise ratio for detecting man-made objects.

According to an embodiment of the present invention, there is provided a method for identifying a target of interest, the method including: receiving one or more digitized radar returns; forming a processed resonance map from the one or more digitized radar returns, the processed resonance map including a plurality of pixels, each pixel having a value; forming a signature discriminant array, each element of the signature discriminant array corresponding to a pixel of the plurality of pixels, each element of the signature discriminant array being: the fourth power of the ratio of: the power within an inner rectangle, to the difference between the power within an outer rectangle and the power within the inner rectangle when the power within the inner rectangle exceeds the power within the outer rectangle, and zero otherwise; the power within the inner rectangle being the sum of the squares of the pixel values in a rectangle of a first height and a first width centered on the corresponding pixel of the plurality of pixels, the power within the outer rectangle being the sum of the squares of the pixel values in a rectangle of a second height and a second width centered on the corresponding pixel of the plurality of pixels, the second height and width being greater than the first height and width, respectively, and the first height and width and the second height and width being selected to match a target of interest.

In one embodiment, the one or more digitized radar returns comprise a plurality of digitized radar returns, and the forming of the processed resonance map from the one or more digitized radar returns includes forming a plurality of raw resonance maps, each of the raw resonance maps being formed from one of the plurality of digitized radar returns by processing the radar return with a modified covariance spectral estimation super resolution function and taking the magnitude of the result, each of the raw resonance maps including a plurality of pixels, each pixel having a value; and setting the value of each pixel of the processed resonance map to be equal to the smallest value of the corresponding set of pixels in the raw resonance maps.

In one embodiment, the method includes: taking the mean of the signature discriminant array to form a discriminant mean; taking the maximum of the signature discriminant array to form a discriminant maximum; dividing the signature discriminant array by the discriminant mean to form a normalized discriminant array; multiplying the processed resonance map, pixel by pixel, by the normalized discriminant array to form a first modified resonance map; multiplying a first constant by the maximum value of the first modified resonance map to form a first threshold; setting to zero all values of the first modified resonance map that are less than the first threshold, to form a second modified resonance map; applying a median filter to the second modified resonance map to form a third modified resonance map; forming a threshold array by: setting to one all values of the signature discriminant array exceeding the product of a second constant, and the discriminant maximum, and setting to zero the remaining values of the signature discriminant array; and multiplying the third modified resonance map, pixel by pixel, by the threshold array to form a fourth modified resonance map.

In one embodiment, the first constant is between 0.5 and 0.9 and the second constant is between ¼ and ½.

In one embodiment, the method includes displaying the fourth modified resonance map on a display.

According to an embodiment of the present invention, there is provided a radar system, including: a radar transmitter; a radar receiver; and a processing unit configured to: receive a plurality of digitized radar returns; form a processed resonance map including a plurality of pixels from the plurality of digitized radar returns, each pixel having a value; form a signature discriminant array, each element of the signature discriminant array corresponding to a pixel of the plurality of pixels, each element of the signature discriminant array being: the fourth power of the ratio of the power within an inner rectangle, to the difference between the power within an outer rectangle and the power within the inner rectangle when the power within the inner rectangle exceeds the power within the outer rectangle, and zero otherwise; the power within the inner rectangle being the sum of the squares of the pixel values in a rectangle of a first height and a first width centered on the corresponding pixel of the plurality of pixels, the power within the outer rectangle being the sum of the squares of the pixel values in a rectangle of a second height and a second width centered on the corresponding pixel of the plurality of pixels, the second height and width being greater than the first height and width, respectively, and the first height and width and the second height and width being selected to match a target of interest.

In one embodiment, the processing unit is further configured to: take the mean of the signature discriminant array to form a discriminant mean; take the maximum of the signature discriminant array to form a discriminant maximum; divide the signature discriminant array by the discriminant mean to form a normalized discriminant array; multiply the processed resonance map, pixel by pixel, by the normalized discriminant array to form a first modified resonance map; multiply a first constant by the maximum value of the first modified resonance map to form a first threshold; set to zero all values of the first modified resonance map that are less than the first threshold, to form a second modified resonance map; apply a median filter to the second modified resonance map to form a third modified resonance map; form a threshold array by: setting to one all values of the signature discriminant array exceeding the product of: a second constant, and the discriminant maximum, and setting to zero the remaining values of the signature discriminant array; and multiply the third modified resonance map, pixel by pixel, by the threshold array to form a fourth modified resonance map.

In one embodiment, the first constant is between 0.5 and 0.9 and the second constant is between ¼ and ½.

In one embodiment, the system includes a display, wherein the processing unit is further configured to display the fourth modified resonance map on the display.

According to an embodiment of the present invention, there is provided a method for identifying a target of interest, the method including: receiving a first radar return from a known sample target; forming a first processed resonance map from the first radar return, the first processed resonance map including a plurality of pixels, each pixel having a value; forming a plurality of first signature discriminant arrays from the first processed resonance map, for a plurality of sets of inner rectangle dimensions and a plurality of sets of outer rectangle dimensions; taking the maximum of each of the plurality of first signature discriminant arrays, to form a plurality of discriminant maximums; selecting a first set of inner rectangle dimensions and a first set of outer rectangle dimensions, the first set of inner rectangle dimensions and the first set of outer rectangle dimensions corresponding to the largest-valued discriminant maximum; receiving a second radar return from a scene; forming a second processed resonance map from the second radar return, the second processed resonance map including a plurality of pixels, each pixel having a value; and forming a second signature discriminant array from the second processed resonance map, for the first set of inner rectangle dimensions and the first set of outer rectangle dimensions.

In one embodiment, the method includes displaying the second signature discriminant array on a display.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system and method for enhanced detection and automatic signature extraction of radar resonance reflections in above and below-ground man-made objects provided in accordance with the present invention and is not'intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
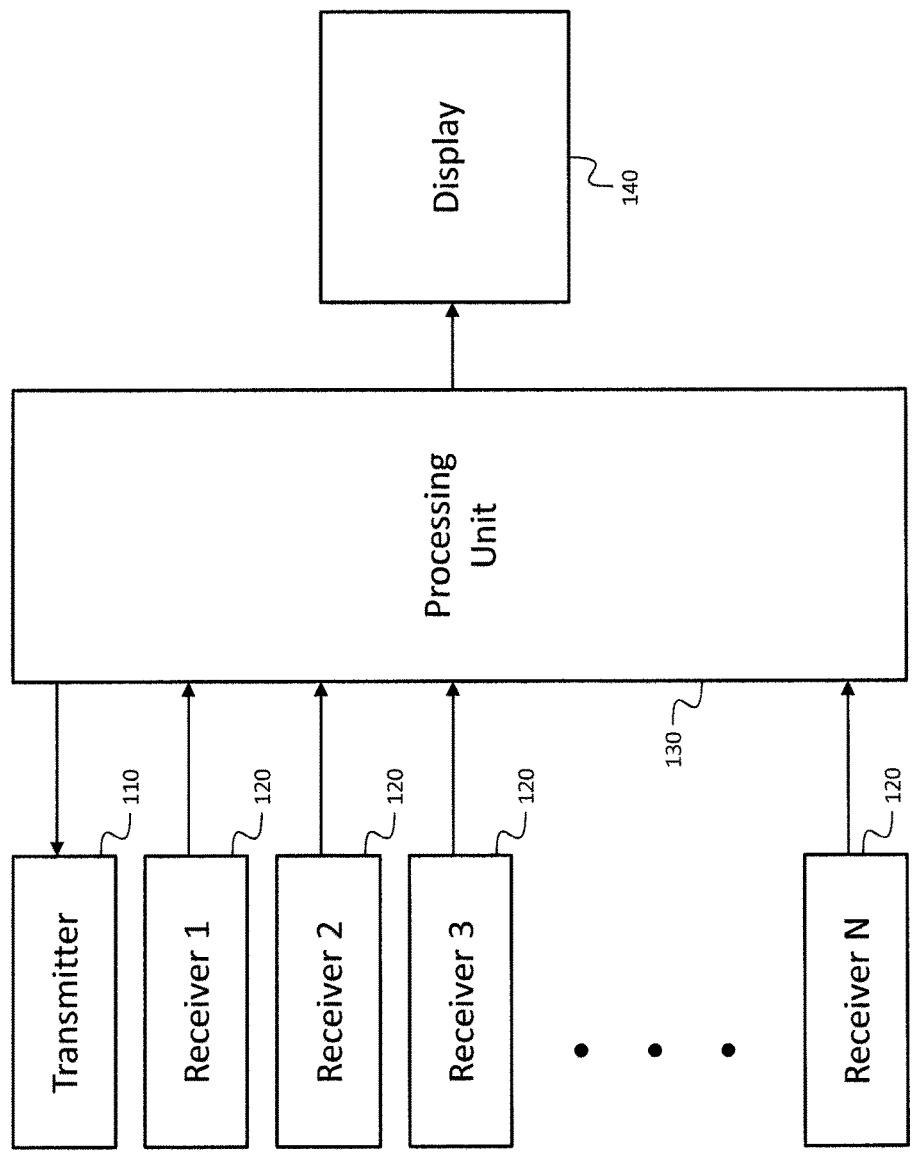
FIG. 1 is a block diagram of a system for detecting man-made objects according to an embodiment of the present invention.

Referring to FIG. 1, in one embodiment, a system for enhanced detection and automatic signature extraction of radar resonance reflections in above and below-ground man-made objects includes a radar transmitter 110, a plurality of radar receivers 120, and a processing unit 130. In one embodiment, the system includes eleven radar receivers 120. The radar transmitter 110 transmits radar pulses to illuminate an area of interest or "scene" that may contain objects of interest, such as man-made objects. The radar pulses reflect from objects illuminated by the radar, and the reflections, or "radar returns", are received by the receivers 120. Each receiver may perform initial processing of the radar returns, such as amplification (e.g., with a low-noise amplifier (LNA)), down-conversion, filtering, and conversion to digital format (e.g., with an analog to digital converter (ADC)), to form a digitized radar return. Each receiver may add receiver noise, e.g., amplifier noise, to the received radar returns. This noise may be uncorrelated between the receivers. The digitized radar returns from the receivers may be fed into a processing unit that processes the digitized radar returns and that may display results on a display 140, for use by an operator. In one embodiment, the transmitter is also connected to the processing unit, and controlled by it. In one embodiment, the radar transmitter 110 and the receivers 120 are mounted on a vehicle, separated in a cross-range direction. In another embodiment, there are multiple transmitters and multiple receivers, e.g., one transmitter per receiver.

The term "processing unit" is used herein to include any combination of hardware, firmware, and software employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing unit, as used herein, each function is performed either by hardware configured, i.e., hard-wired, to perform that function, or by more general purpose hardware, such as a CPU, configured to execute instructions stored in a non-transitory storage medium. A processing unit may be fabricated on a single printed wiring board (PWB) or distributed over a plurality of interconnected PWBs. A processing unit may contain other processing units; for example, a processing unit may include two processing units, an FPGA and a CPU, interconnected on a PWB.

In the processing unit, data processing may be performed by modules. As used herein, a "module" is a system element that receives digital numerical input and generates digital numerical output. The numerical input and output may be stored in memory in a batch mode, in which, for example, an output array is formed and stored on a stack or in a heap for subsequent use or processing, or the numerical input and/or output may be streamed out of the module in smaller increments, e.g., one double-precision number at a time, or one byte at a time. The module may be implemented in software or in hardware or in a combination thereof. In one embodiment, each module is a piece of software (e.g., a function, a subroutine, or an object) running on a processing unit. In each case, the module has the effect of performing an operation on the data it receives, to generate the data that it produces. Thus for embodiments disclosed herein, a system including a module that performs an operation is equivalent to the system being configured to perform the operation. For example, a fast Fourier transform (FFT) module performs an FFT operation on the input data that are fed to it, to form output data that are the FFT of the input data. A module may contain or include other modules; e.g., a function may call other functions, or a piece of data processing hardware, such as an FPGA, may contain modules such as functional blocks, each performing operations contributing to data processing performed by the FPGA.

Figure 2:
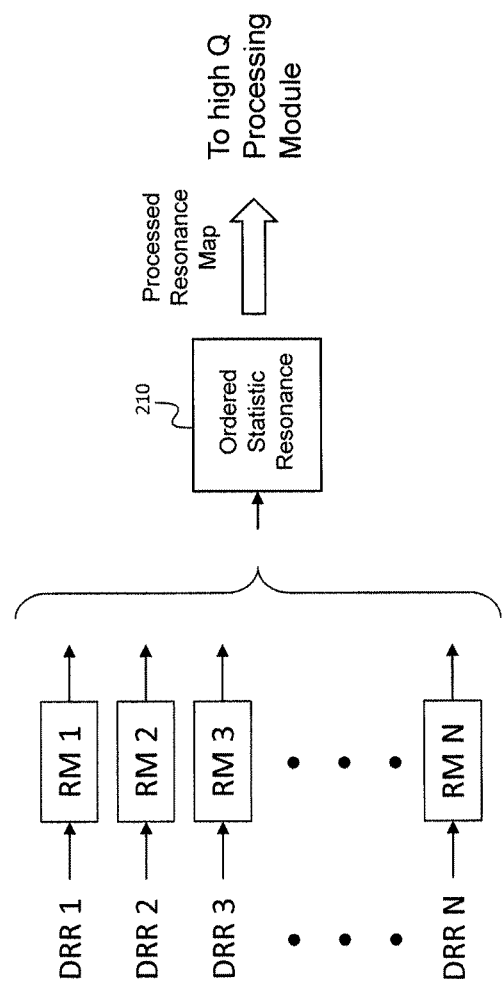
FIG. 2 is a block diagram illustrating the combination of signals with independent receiver noise according to an embodiment of the present invention.
Figure 4:
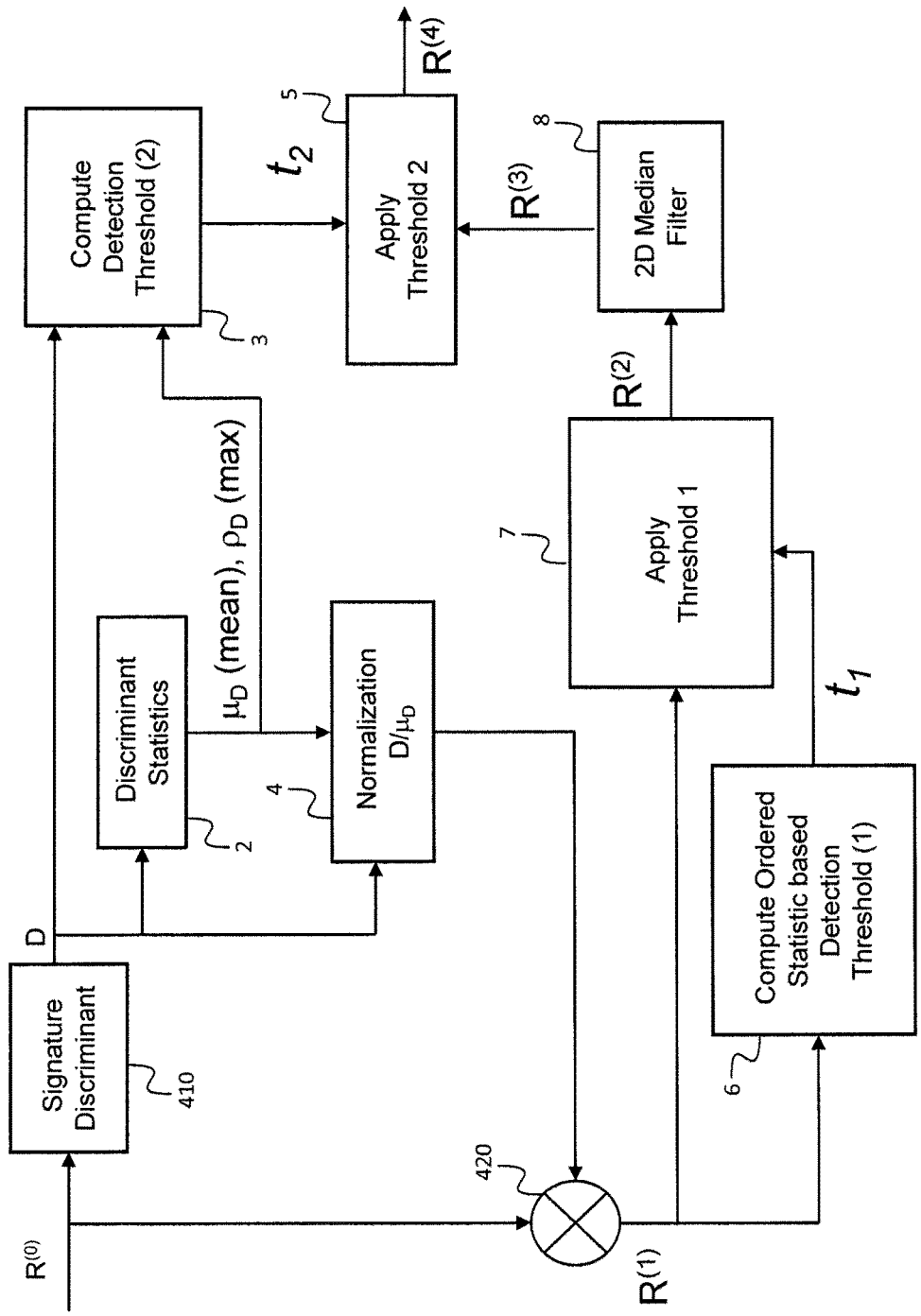
FIG. 4 is a block diagram of modules for forming a modified resonance map according to an embodiment of the present invention.

Referring to FIG. 2, each digitized radar return (DRR 1 through DRR N) is processed by a resonance map module (RM 1 through RM N) to form a respective time frequency map referred to as a raw resonance map. The raw resonance map is (or may be represented as) a two-dimensional array, with one index (corresponding to an axis of the map) being time and the other index (corresponding to the other axis of the map) being frequency. Each array element, which may be referred to as a pixel, then corresponds to a time value and a frequency value. In one embodiment, as will be understood by one of skill in the art, each resonance map module implements a Prony super-resolution module to form a resonance map. In another embodiment, a resonance map is formed using a modified covariance spectral estimation super resolution function. In yet another embodiment, each raw resonance map is formed by performing a series of short-time FFTs on the corresponding digitized radar return. In each case, if the output of the process for forming the resonance map is complex, the magnitude of the output (an array of real numbers) is used as the resonance map. The N resonance maps that result are then combined using an ordered statistic, such as a median or a minimum, to form a resonance map referred to herein as a processed resonance map. For example, the processed resonance map may be of the same size as any of the raw resonance maps, and the value of each pixel of the processed resonance map may be the median (or the minimum) of the values of the corresponding pixels in the raw resonance maps. An odd number N of resonance maps, e.g., eleven resonance maps, may be used if the median is the ordered statistic used, so that the median has a natural definition as the element for which half of the remaining elements are greater than or equal to the median, and half of the remaining elements are less than or equal to the median. The processed resonance map may have a better signal to noise ratio than any of the raw resonance maps in part because the ordered statistic operation may suppress the uncorrelated noise from different receivers relative to the radar return, the latter being correlated in the receivers. In other embodiments, a single receiver is used, and radar returns taken at different points in time are used to form raw resonance maps, which again may contain uncorrelated noise, to the extent that the receiver noise at the different points in time is uncorrelated, and these raw resonance maps may also be processed with an ordered statistic. The processed resonance map is then fed to a subsequent module referred to herein as a high-Q processing module (FIG. 4).

Figure 3:
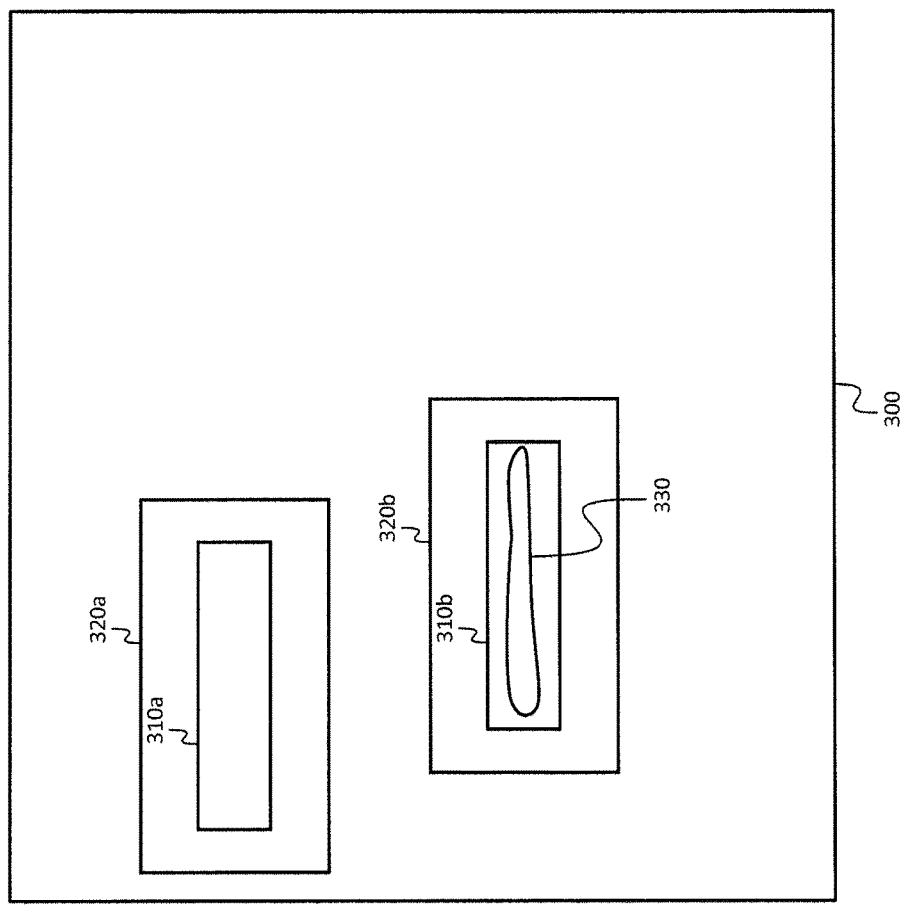
FIG. 3 is a diagram of a resonance map illustrating the operation of a signature discriminant, according to an embodiment of the present invention.

One module of the high-Q processing module may be a signature discriminant module. Referring to FIG. 3, the signature discriminant module calculates, for a given pixel in the input resonance map 300 (which may be the processed resonance map) the power, or "inner rectangle power", in a first, inner rectangle 310a, 310b, and the power, or "margin power", in a region between the inner rectangle and an outer rectangle 320a, 320b. The margin power may equivalently be defined or calculated as the difference between the power in the outer rectangle and the inner rectangle power. In each of these cases, the power is calculated as the sum of the squares of the pixel values in the respective area (i.e., in the inner rectangle or in the region between the inner and outer rectangles). The signature discriminant module then calculates the value of each pixel of the signature discriminant as (i) the fourth power of the ratio of the inner power to the margin power if the inner rectangle power exceeds the margin power and (ii) zero otherwise. The signature discriminant module performs this calculation for each pixel in the processed resonance map for which it is defined, i.e., for each pixel sufficiently far from the edge of the processed resonance map that an outer rectangle centered on the pixel falls entirely within the processed resonance map. For an input resonance map 300 containing a small region 330 of significant power (corresponding, e.g., to radar returns from a man-made object), the signature discriminant may be relatively small for a pair of rectangles 310a, 320a, not containing the region 330 of significant power, and the signature discriminant may be relatively large for a pair of rectangles 310b, 320b, containing the region 330 of significant power. The output of the signature discriminant module is another two-dimensional array, with a width smaller than the width of the processed resonance map by the width of the outer rectangle, and a height smaller than the height of the processed resonance map by the height of the outer rectangle; this output array is referred to herein as a signature discriminant array.

Listing 1 below shows MATLAB™ code implementing a signature discriminant module according to one embodiment.

Listing 1

```
1  function discriminant = compute_discriminant( im, l_row,
     l_col, row_pad, col_pad)
2  %
3  [nr,nc]=size(im);
4
5  l_col_over_2 = round(l_col/2);
6  l_row_over_2 = round(l_row/2);
7
```

-continued

Listing 1

```
 8  l_col_out_idx = [1:l_col+2*col_pad]-l_col_over_2-col_pad;
 9  l_col_in_idx = [1:l_col]-l_col_over_2;
10
11  l_row_out_idx = [1:l_row+2*row_pad]-l_row_over_2-row_pad;
12  l_row_in_idx = [1:l_row]-l_row_over_2;
13
14  discriminant = single( zeros(nr,nc) );
15
16  for nc = l_col_over_2+col_pad : nc - l_col_over_2-col_pad
17
18    cidx_out = l_col_out_idx + nc;
19    cidx_in = l_col_in_idx + nc;
20
21    for nr = l_row_over_2+row_pad : nr-l_row_over_2-row_pad
22
23      ridx_out = l_row_out_idx + nr;
24      ridx_in = l_row_in_idx + nr;
25
26      outer = sum(sum(im(ridx_out,cidx_out)));
27      inner = sum(sum(im(ridx_in, cidx_in)));
28
29      numer = inner ./ (l_row*l_col);
30      denom = (outer-inner) ./ ((l_row+2*row_pad)*(l_col+
    2*col_pad));
31
32      discriminant(nr,nc) = (single(numer>denom).*numer./denom)^4;
33
34    end
35  end
36
37
38  % get rid of nan terms
39  discriminant(discriminant~=discriminant)=0;
```

In one embodiment, referring to FIG. 4, and to Listing 2 below, the high-Q processing module includes a plurality of modules in addition to the signature discriminant module 410, and generates an output resonance map, referred to herein as a fourth modified resonance map, that may contain an enhanced signal for a man-made object when one is present in the region illuminated by the radar. In one processing branch within the high-Q processing module, the processed resonance map $R^{(0)}$ produced by the ordered statistic resonance module 210 is fed into the signature discriminant module 410 as described above, to form a signature discriminant array D. The signature discriminant array is then fed into a discriminant statistics module 2 (implemented in lines 10 and 11 of Listing 2) that calculates the mean or "discriminant mean", and the maximum or "discriminant maximum", of the signature discriminant array. Both the signature discriminant array and the discriminant mean are fed into a normalization module 4 (implemented in line 14 of Listing 2), in which the signature discriminant array is normalized by dividing it by the discriminant mean, to produce a normalized discriminant array, which is multiplied, pixel by pixel, by the processed resonance map, in a multiplying module 420 (also implemented in line 14 of Listing 2), to form a first modified resonance map $R^{(1)}$.

In a first threshold calculating module 6 ("Block 6" in Listing 2), an ordered statistic based detection threshold is then found, e.g., the maximum value of the first modified resonance map is found, and multiplied by a first constant (at line 19 of Listing 2) to form a first threshold $t_1$. In one embodiment (e.g., in the code of Listing 2), the first constant (thr1 in Listing 2) is 0.7. Both the first modified resonance map and the first threshold are fed into a first threshold application module 7 ("Block 7" in Listing 2) that sets to zero all values of the first modified resonance map that are less than the first threshold, to form a second modified resonance map $R^{(2)}$. The second modified resonance map is fed into a median filter module 8 ("Block 8" in Listing 2) that applies a median filter to the second modified resonance map, to form a third modified resonance map $R^{(3)}$. In one embodiment, the median filter operates on each 3×3 block of pixels in the input array (the second modified resonance map) and substitutes, for the central pixel in the 3×3 block, the median of the values of the nine pixels in the 3×3 block. In another processing branch, a detection threshold module 3 (implemented in line 29 of Listing 2) calculates a second threshold as the product of a second constant and the discriminant maximum, and forms a threshold array $t_2$ (the variable t2 in Listing 2) by setting to one all values of the signature discriminant array exceeding the second threshold, and setting to zero the remaining values of the signature discriminant array. In one embodiment, the second constant is ⅓ (as defined, e.g., in line 4 of Listing 2). Finally a second threshold application module 5 (implemented in line 32 of Listing 2) multiplies the third modified resonance map, pixel by pixel, by the threshold array, to form a fourth modified resonance map $R^{(4)}$, which is the output of the high-Q processing module. In one embodiment, the effect of applying the threshold in the second threshold application module 5 is to set to zero all elements of the third modified resonance map that have been determined to correspond only to noise or clutter in the third modified resonance map.

In one embodiment, the respective dimensions, i.e., the respective height and width, of the inner and outer rectangles used in the signature discriminant module 410 are chosen by obtaining a radar return with a sample of a man-made object of interest, forming a raw resonance map, and processing the raw resonance map with the signature discriminant module with various trial values for the dimensions of the two rectangles, until the signal to noise ratio enhancement obtained is acceptable, or until it is optimized. This process for selecting rectangle dimensions may be performed with the sample object above ground, or buried, or it may be performed with both. As an alternative to burying a sample object, the radar return of a buried object may be simulated by measuring an above-ground radar return, and using an electromagnetic propagation model, as is known to those of skill in the art, to calculate what the return would be if the object were buried. In one embodiment, the dimensions of the two rectangles are adjusted until a maximum value of the signature discriminant (i.e., the maximum, as a function of the four parameters (inner rectangle height and width, and outer rectangle height and width), of the discriminant maximum) is found.

Listing 2

```
 1  % Set thresholds and parameters
 2  res_thr1 = 0.7;
 3  N_med=3;
 4  disc_thr = 1/3;
 5
 6  % Compute the discriminant here
 7  discriminant = compute_discriminant( R0, 10, 80, 10, 0);
 8
 9  % discriminant statistics
10  disc_avg = mean(discriminant(:));
11  disc_max = max(discriminant(:));
12
13  % enhance resonance using signature correlation weighting
14  R1 = discriminant./disc_avg.*R0
15  % Block 6
16  R1_max = max(R1(:));
```

Listing 2

```
17
18 % compute threshold 1
19 t1 = R1_max*res_thr1;
20
21 % apply threshold values that are below some factor of the peak
22 % Block 7
23 R2 = R1;
24 R2(R2<t1)=0;
25
26 % Block 8: discard outliers with ordered statistic filter
27 R3 = medfilt2( R2, [N_med,N_med] );
28
29 t2 = discriminant > (disc_max*disc_thr); % logical threshold 2
   (0 or 1)
30
31 % apply final threshold
32 R4 = R3 .* t2;
```

In one embodiment, the processing illustrated in FIG. 4 provides an improvement in the signal to noise ratio, in the fourth modified resonance map, over the signal to noise ratio of the raw resonance maps. In other embodiments, a subset of the processing steps illustrated may be performed, the subset also providing an improvement in the signal to noise ratio. For example, the processed resonance map that is the output of the ordered statistic resonance module 210 may have a better signal to noise ratio than the raw resonance maps. In another example, the processing provided by both the ordered statistic resonance module and the signature discriminant module 410 may provide an improvement in the signal to noise ratio over that of the raw resonance maps, and in a third example, the signature discriminant alone may, at its output, provide an improvement in the signal to noise ratio over that of a raw resonance map fed to it as input. These improvements in signal to noise ratio may be due in part, or entirely, to characteristics that artificial or "man-made" objects may have, such as the presence of highly-conductive portions (e.g., pieces of metal), that may be absent from natural objects. For example, an improvised explosive device (IED) referred to as a 155 IED, or a hacksaw blade used as a pressure switch, may both contain enough metal to cause these artificial objects to behave as high-Q resonators when illuminated by radar radiation.

Processed resonance maps such as the fourth modified resonance map may be directly displayed to a suitably trained human operator (e.g., using a graphical display device, or "display"), or they may be interpreted before being displayed. For example, any non-zero elements of the fourth modified resonance map may correspond to potential targets, i.e., man-made objects, elements of the fourth modified resonance map that contain noise or clutter having been set to zero. The position of each non-zero pixel, or cluster of pixels, along the time axis of the fourth modified resonance map is an indication of the range to that target; the system therefore may display for the operator a list of targets with an estimated range to each.

In one embodiment, multiple instances of the high-Q processing module may run in parallel, or in sequence, with parameters in each instance optimized for different man-made objects. For example, one instance may be optimized for hacksaw blades, and another instance may be optimized for a 155 IED. The results from the two high-Q processing module instances may then be combined, e.g., in a color-coded display, showing the operator suspected 155 IEDs in one color and suspected hacksaw blade pressure switches in another color.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially", "about", and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of present invention". Also, the term "exemplary" is intended to refer to an example or illustration.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although limited embodiments of a system and method for enhanced detection and automatic signature extraction of radar resonance reflections in above and below-ground man-made objects have been specifically described and illustrated herein, many modifications and variations will be apparent to those skilled in the art. Accordingly, it is to be understood that a system and method for enhanced detection and automatic signature extraction of radar resonance reflections in above and below-ground man-made objects employed according to principles of this invention may be embodied other than as specifically described herein. The invention is also defined in the following claims, and equivalents thereof.

What is claimed is:

1. A method for identifying a target of interest, the method comprising:
   generating, by a radar transmitter and a radar receiver, one or more digitized radar returns;

forming, by a processing unit, a processed resonance map from the one or more digitized radar returns, the processed resonance map comprising a plurality of pixels, each pixel having a value; and forming, by the processing unit, a signature discriminant array, each element of the signature discriminant array corresponding to a pixel of the plurality of pixels, each element of the signature discriminant array being:

the fourth power of the ratio of:
  the power within an inner rectangle, to
  the difference between the power within an outer rectangle and the power within the inner rectangle
when the power within the inner rectangle exceeds the power within the outer rectangle, and
zero otherwise;

the power within the inner rectangle being the sum of the squares of the pixel values in a rectangle of a first height and a first width centered on the corresponding pixel of the plurality of pixels, the power within the outer rectangle being the sum of the squares of the pixel values in a rectangle of a second height and a second width centered on the corresponding pixel of the plurality of pixels, the second height and width being greater than the first height and width, respectively, and the first height and width and the second height and width being selected to match a target of interest.

2. The method of claim 1, wherein the one or more digitized radar returns comprise a plurality of digitized radar returns, and the forming of the processed resonance map from the one or more digitized radar returns comprises:

forming a plurality of raw resonance maps, each of the raw resonance maps being formed from one of the plurality of digitized radar returns by processing the radar return with a modified covariance spectral estimation super resolution function and taking the magnitude of the result, each of the raw resonance maps comprising a plurality of pixels, each pixel having a value; and setting the value of each pixel of the processed resonance map to be equal to the smallest value of the corresponding set of pixels in the raw resonance maps.

3. The method of claim 1, further comprising:

taking the mean of the signature discriminant array to form a discriminant mean;

taking the maximum of the signature discriminant array to form a discriminant maximum;

dividing the signature discriminant array by the discriminant mean to form a normalized discriminant array;

multiplying the processed resonance map, pixel by pixel, by the normalized discriminant array to form a first modified resonance map;

multiplying a first constant by the maximum value of the first modified resonance map to form a first threshold;

setting to zero all values of the first modified resonance map that are less than the first threshold, to form a second modified resonance map;

applying a median filter to the second modified resonance map to form a third modified resonance map;

forming a threshold array by:
  setting to one all values of the signature discriminant array exceeding the product of:
    a second constant, and
    the discriminant maximum, and
  setting to zero the remaining values of the signature discriminant array; and multiplying the third modified resonance map, pixel by pixel, by the threshold array to form a fourth modified resonance map.

4. The method of claim 3, wherein the forming of the processed resonance map comprises:

receiving a plurality of digitized radar returns;

forming a plurality of raw resonance maps, each of the raw resonance maps formed from one of the plurality of digitized radar returns by processing the digitized radar return with a modified covariance spectral estimation super resolution function and taking the magnitude of the result, each of the raw resonance maps comprising a plurality of pixels, each pixel having a value; and setting the value of each pixel of the processed resonance map to be equal to the smallest value of the corresponding set of pixels in the raw resonance maps.

5. The method of claim 4, wherein the first constant is between 0.5 and 0.9 and the second constant is between ¼ and ½.

6. The method of claim 4, further comprising displaying the fourth modified resonance map on a display.

7. A radar system, comprising:
a radar transmitter;
a radar receiver; and
a processing unit configured to:
  receive a plurality of digitized radar returns;
  form a processed resonance map comprising a plurality of pixels from the plurality of digitized radar returns, each pixel having a value;
  form a signature discriminant array, each element of the signature discriminant array corresponding to a pixel of the plurality of pixels, each element of the signature discriminant array being:
    the fourth power of the ratio of:
      the power within an inner rectangle, to the difference between the power within an outer rectangle and the power within the inner rectangle when the power within the inner rectangle exceeds the power within the outer rectangle, and zero otherwise;
  the power within the inner rectangle being the sum of the squares of the pixel values in a rectangle of a first height and a first width centered on the corresponding pixel of the plurality of pixels,
  the power within the outer rectangle being the sum of the squares of the pixel values in a rectangle of a second height and a second width centered on the corresponding pixel of the plurality of pixels,
  the second height and width being greater than the first height and width, respectively, and
  the first height and width and the second height and width being selected to match a target of interest.

8. The system of claim 7, wherein the forming of the processed resonance map from the plurality of digitized radar returns comprises:

forming a plurality of raw resonance maps, each of the raw resonance maps formed from one of the plurality of digitized radar returns by processing the digitized radar return with a modified covariance spectral estimation super resolution function and taking the magnitude of the result, each of the raw resonance maps comprising a plurality of pixels, each pixel having a value; and setting the value of each pixel of the processed resonance map to be equal to the smallest value of the corresponding set of pixels in the raw resonance maps.

9. The system of claim 7, wherein the processing unit is further configured to:

take the mean of the signature discriminant array to form a discriminant mean;

take the maximum of the signature discriminant array to form a discriminant maximum;

divide the signature discriminant array by the discriminant mean to form a normalized discriminant array;

multiply the processed resonance map, pixel by pixel, by the normalized discriminant array to form a first modified resonance map;

multiply a first constant by the maximum value of the first modified resonance map to form a first threshold;

set to zero all values of the first modified resonance map that are less than the first threshold, to form a second modified resonance map;

apply a median filter to the second modified resonance map to form a third modified resonance map;

form a threshold array by:
    setting to one all values of the signature discriminant array exceeding the product of:
        a second constant, and
        the discriminant maximum, and
    setting to zero the remaining values of the signature discriminant array; and multiply the third modified resonance map, pixel by pixel, by the threshold array to form a fourth modified resonance map.

10. The system of claim 9, wherein the forming of the processed resonance map from the plurality of digitized radar returns comprises:
    forming a plurality of raw resonance maps, each of the raw resonance maps formed from one of the plurality of digitized radar returns by processing the radar return with a modified covariance spectral estimation super resolution function and taking the magnitude of the result, each of the raw resonance maps comprising a plurality of pixels, each pixel having a value; and
    setting the value of each pixel of the processed resonance map to be equal to the smallest value of the corresponding set of pixels in the raw resonance maps.

11. The system of claim 10, wherein the first constant is between 0.5 and 0.9 and the second constant is between ¼ and ½.

12. The system of claim 10, further comprising a display, wherein the processing unit is further configured to display the fourth modified resonance map on the display.

13. A method for identifying a target of interest, the method comprising:
    receiving a first radar return from a known sample target;
    forming a first processed resonance map from the first radar return, the first processed resonance map comprising a plurality of pixels, each pixel having a value;
    forming a plurality of first signature discriminant arrays from the first processed resonance map, for a plurality of sets of inner rectangle dimensions and a plurality of sets of outer rectangle dimensions;
    taking the maximum of each of the plurality of first signature discriminant arrays, to form a plurality of discriminant maximums;
    selecting a first set of inner rectangle dimensions and a first set of outer rectangle dimensions, the first set of inner rectangle dimensions and the first set of outer rectangle dimensions corresponding to the largest-valued discriminant maximum;
    receiving a second radar return from a scene;
    forming a second processed resonance map from the second radar return, the second processed resonance map comprising a plurality of pixels, each pixel having a value; and
    forming a second signature discriminant array from the second processed resonance map, for the first set of inner rectangle dimensions and the first set of outer rectangle dimensions.

14. The method of claim 13, wherein the forming of a signature discriminant array from an input resonance map, for a set of input inner rectangle dimensions and a set of input outer rectangle dimensions, the input resonance map comprising a plurality of input pixels, each of the input pixels having an input pixel value, comprises:
    forming the signature discriminant array as an array comprising a plurality of output pixels, each of the output pixels corresponding to an input pixel and having an output pixel value, each output pixel value being:
        the fourth power of the ratio of:
            the power within an inner rectangle, to the difference between the power within an outer rectangle and the power within the inner rectangle when the power within the inner rectangle exceeds the power within the outer rectangle, and zero otherwise;
    the power within the inner rectangle being the sum of the squares of the input pixel values in a rectangle having as dimensions the set of input inner rectangle dimensions centered on the corresponding input pixel,
    the power within the outer rectangle being the sum of the squares of the input pixel values in a rectangle having as dimensions the set of input outer rectangle dimensions centered on the corresponding input pixel.

15. The method of claim 13, further comprising displaying the second signature discriminant array on a display.

* * * * *